US012673340B2

(12) United States Patent
Kobayashi

(10) Patent No.: US 12,673,340 B2
(45) Date of Patent: Jul. 7, 2026

(54) WIPING DEVICE AND LIQUID DISCHARGE APPARATUS

(71) Applicant: Takeyuki Kobayashi, Kanagawa (JP)

(72) Inventor: Takeyuki Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 348 days.

(21) Appl. No.: 18/431,114

(22) Filed: Feb. 2, 2024

(65) Prior Publication Data

US 2024/0316588 A1 Sep. 26, 2024

(30) Foreign Application Priority Data

Mar. 24, 2023 (JP) ................................. 2023-048102

(51) Int. Cl.
*B05B 15/50* (2018.01)
*B08B 1/14* (2024.01)
*B41J 2/165* (2006.01)

(52) U.S. Cl.
CPC ................ *B05B 15/50* (2018.02); *B08B 1/14* (2024.01); *B41J 2002/1655* (2013.01); *B41J 2002/1657* (2013.01)

(58) Field of Classification Search
CPC .................................................... B41J 2/16535
USPC ............................................................ 347/33
See application file for complete search history.

(56) References Cited

U.S. PATENT DOCUMENTS

2012/0050403 A1* 3/2012 Inoue .................. B41J 2/16585 347/33
2013/0135368 A1 5/2013 Kobayashi et al.
2017/0136778 A1 5/2017 Kobayashi et al.
2018/0072061 A1* 3/2018 Moya Rojo .......... B41J 2/16544
2018/0170087 A1 6/2018 Kobayashi et al.
2021/0178773 A1 6/2021 Kobayashi
2021/0245534 A1 8/2021 Morino et al.
2021/0276346 A1 9/2021 Kobayashi et al.
2022/0297434 A1 9/2022 Morino et al.
2022/0305796 A1 9/2022 Takahashi et al.
2022/0305797 A1 9/2022 Takahashi et al.
(Continued)

FOREIGN PATENT DOCUMENTS

JP 2012-126090 A 7/2012
JP 2019-130679 A 8/2019

*Primary Examiner* — Douglas X Rodriguez
*Assistant Examiner* — Rami A Alshoroogi
(74) *Attorney, Agent, or Firm* — Harness, Dickey & Pierce, P.L.C.

(57) ABSTRACT

A wiping device includes a web, multiple pressing mechanisms, and circuitry. The web is windable in a winding direction and a rewinding direction, to wipe nozzle faces of multiple liquid discharge heads arranged in a width direction. The multiple pressing mechanisms are arranged in the width direction corresponding to the multiple liquid discharge heads. Each of the multiple pressing mechanisms is movable between a wiping position and a retracted position. The circuitry stores unused portion of the web at which a part of the multiple pressing mechanisms is at the retracted position during wiping, rewinds the web in the rewinding direction to cause the unused portion to face a part of the nozzle faces unwiped, and causes the part of the multiple pressing mechanisms corresponding to the unused portion to move to the wiping position to bring the unused portion into contact with the part of the nozzle faces unwiped.

5 Claims, 10 Drawing Sheets

(56) References Cited

U.S. PATENT DOCUMENTS

| | | | |
|---|---|---|---|
| 2023/0016931 | A1 | 1/2023 | Aoki et al. |
| 2023/0202180 | A1 | 6/2023 | Matsumoto et al. |

* cited by examiner

WIPING DEVICE AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2023-048102, filed on Mar. 24, 2023, in the Japan Patent Office, the entire disclosure of which is hereby incorporated by reference herein.

BACKGROUND

Technical Field

Embodiments of the present disclosure relate to a wiping device and a liquid discharge apparatus.

Related Art

In the related art, a wiping device includes a web serving as a windable wiper. The web wipes a nozzle face of a liquid discharge head while contacting the nozzle face.

SUMMARY

Embodiments of the present disclosure describe an improved wiping device that includes a web, multiple pressing mechanisms, and circuitry. The web is windable in a winding direction and a rewinding direction opposite to the winding direction, to wipe nozzle faces of multiple liquid discharge heads arranged in a width direction orthogonal to the winding direction. The multiple pressing mechanisms are arranged in the width direction corresponding to the multiple liquid discharge heads. Each of the multiple pressing mechanisms is movable between a wiping position to cause the web to contact corresponding one of the nozzle faces of the multiple liquid discharge heads and a retracted position to cause the web to be separated from the corresponding one of the nozzle faces. The circuitry is configured to store unused portion of the web at which a part of the multiple pressing mechanisms is at the retracted position during wiping in a memory, rewind the web in the rewinding direction to cause the unused portion of the web to face a part of the nozzle faces unwiped, and cause the part of the multiple pressing mechanisms corresponding to the unused portion of the web to move to the wiping position to bring the unused portion of the web into contact with the part of the nozzle faces unwiped.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
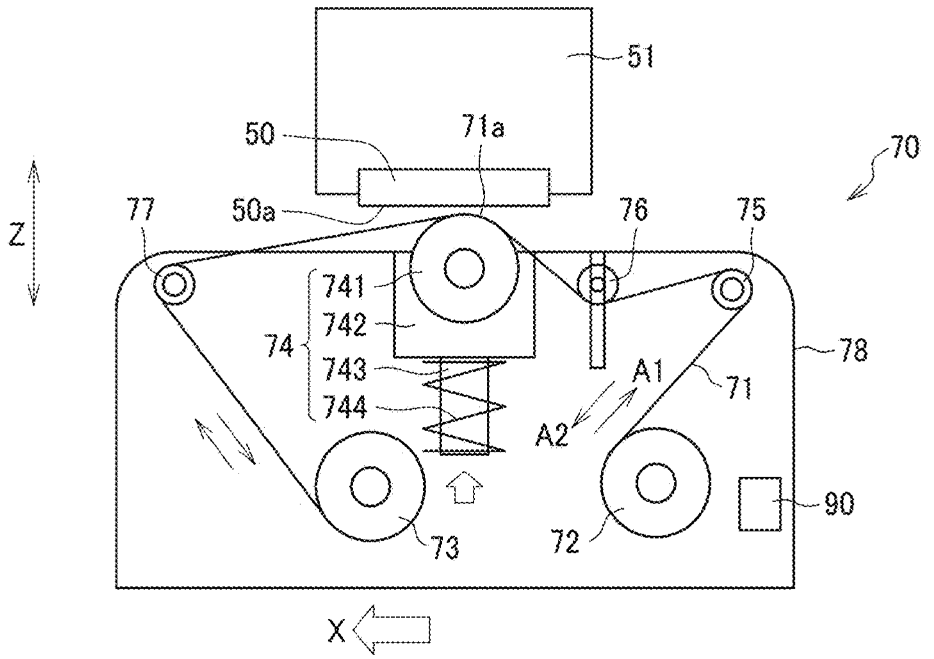
FIG. 1 is a side view of a wiping device according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the drawings, like reference signs denote like elements, and overlapping description may be simplified or omitted as appropriate.

FIG. 1 is a schematic diagram illustrating a configuration of an image forming apparatus according to an embodiment of the present disclosure. As illustrated in FIG. 1, a wiping device 70 includes a web 71 as a windable wiper, a feed roller 72, a winding roller 73, a pressing mechanism 74 including a pressing roller 741 as a pressing member, and multiple tension rollers 75 to 77. The wiping device 70 wipes a nozzle face 50*a* on which the opening ends of nozzles of a liquid discharge head 50 mounted on a head array 51 are formed.

Preferably, the web 71 is a sheet-shaped material that has absorbency and liquid resistance, at least, against the liquid to be used and does not cause fuzz and dust. Examples of such materials include, but are not limited to, nonwoven fabric, cloth, film, and paper. The web 71 is wound around the outer circumferential surfaces of the feed roller 72 and the winding roller 73 to hold the web 71.

The feed roller 72, the winding roller 73, the pressing roller 741, and the tension rollers 75 to 77 are rotatably attached to a housing 78 of the wiping device 70. As the winding roller 73 rotates, the web 71 is fed from the feed roller 72 in the direction indicated by arrow A1, conveyed to the winding roller 73 via the pressing roller 741 and the tension rollers 75 to 77, and wound around the winding roller 73.

A driver such as a drive motor 80 (see FIG. 5) is coupled to the winding roller 73, and the winding roller 73 can be rotated in both forward and reverse directions by the driving force of the driver. As the winding roller 73 rotates in the forward direction, the web 71 is fed from the feed roller 72 in the direction indicated by arrow A1 and wound around the winding roller 73. On the other hand, as the winding roller 73 rotates in the reverse direction, the web 71 is conveyed in the direction indicated by arrow A2 and rewound around the feed roller 72. The directions indicated by arrow A1 and arrow A2 are winding and rewinding directions of the web 71 or conveyance directions of the web 71. The conveyance directions of the web 71 are also a longitudinal direction along the surface of the web 71. The conveyance direction indicated by arrow A1 is referred to as the winding direction of the web 71, and the conveyance direction indicated by arrow A2 is referred to as the rewinding direction of the web 71.

The pressing mechanism 74 includes the pressing roller 741, a holder 742, a displacement member 743, and a pressing spring 744. The holder 742 rotatably holds the pressing roller 741. The pressing roller 741 contacts the web 71 and presses the web 71 against the nozzle face 50*a*. A portion of the web 71 pressed by the pressing roller 741 is a wiping portion 71*a* that wipes the nozzle face 50*a*.

The displacement member 743 is displaceable in the directions Z to approach and separate from the nozzle face 50*a*, which is the vertical direction in FIG. 1. Due to such a displacement, the pressing roller 741 is displaced in the vertical direction to switch between a wiping posture in which the wiping portion 71*a* contacts the nozzle face 50*a* and a retracted posture in which the wiping portion 71*a* is retracted from the nozzle face 50*a* and is not in contact with the nozzle face 50*a*. The displacement member 743 is displaced by a suitable drive mechanism such as a motor and a cam, or an electromagnetic solenoid. The retracted posture is not necessarily limited to a posture in which the wiping portion 71*a* is completely out of contact with the nozzle face 50*a*, and may be a posture in which the wiping portion 71*a* is retracted downward in FIG. 1, i.e., farther away from the nozzle face 50*a* than in the wiping posture. The pressing spring 744 biases the holder 742 upward in FIG. 1, i.e., toward the nozzle face 50*a*.

The wiping portion 71*a* is pressed against the nozzle face 50*a*, and the housing 78 of the wiping device 70 is moved in the direction indicated by blank arrow X in FIG. 1 to cause the web 71 to wipe the nozzle face 50*a*. At this time, when a pressing force is applied to the pressing roller 741 downward in FIG. 1, the holder 742 and the pressing roller 741 are displaced downward in FIG. 1 against the biasing force of the pressing spring 744. Accordingly, the abrasion of the nozzle face 50*a* due to an excessive sliding load between the web 71 and the nozzle face 50*a* can be prevented.

When the wiping operation of the nozzle face 50*a* is completed, the web 71 is wound around the winding roller 73 so that an unused wiping portion of the web 71 faces the pressing roller 741. Thus, the wiping operation by the web 71 is ready. When the web 71 is further wound around the winding roller 73 and has no more unused wiping portion facing the pressing roller 741, the web 71 is depleted (i.e., in an end state). When the web 71 is in the end state, the web 71 is replaced with a new web 71.

The wiping device 70 includes a wiping controller 90. The wiping controller 90 controls the rotation of the drive motor 80 (see FIG. 5) that drives the winding roller 73 to convey the web 71 in the winding direction and the rewinding direction.

Figure 2:
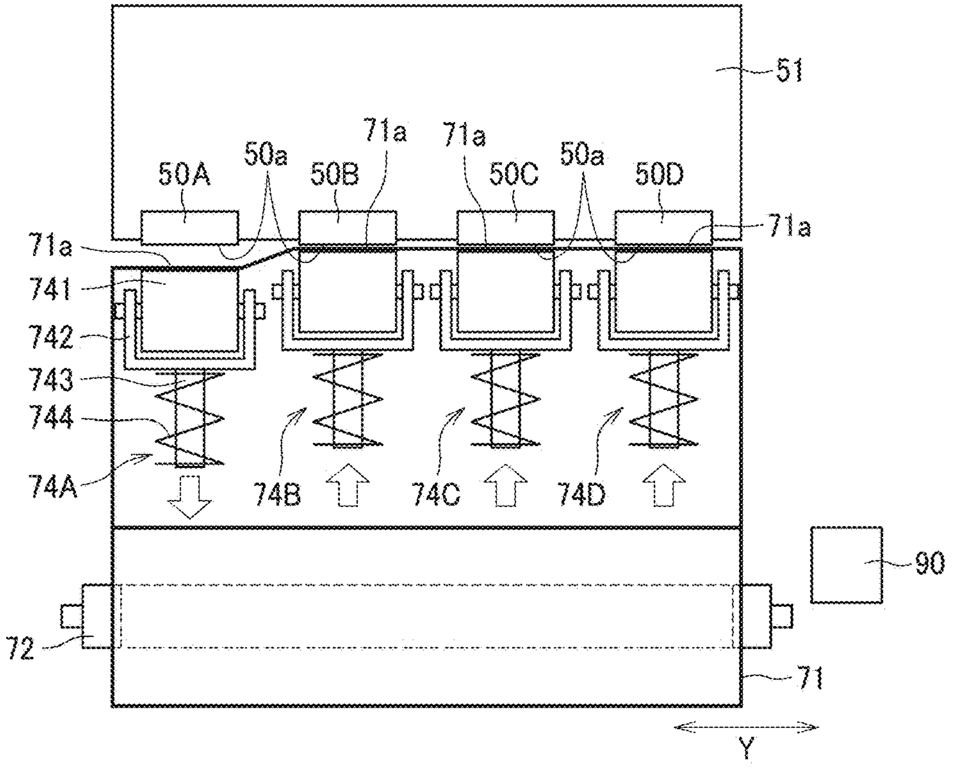
FIG. 2 is a front view of a wiping device according to a first embodiment of the present disclosure.

As illustrated in FIG. 2, multiple (four in FIG. 2) pressing mechanisms 74A to 74D are arranged in the directions Y (left-right directions) in FIG. 2. The pressing mechanisms 74A to 74D are positioned so as to face the nozzle faces 50*a* of multiple liquid discharge heads 50A to 50D mounted on the head array 51, respectively. The directions Y (left-right directions) in FIG. 2 are a width direction of the web 71 and also an arrangement direction in which the liquid discharge heads 50A to 50D are arranged in parallel or the pressing mechanisms 74A to 74D are arranged in parallel. The pressing mechanisms 74A to 74D have the same configuration except for the arrangement, and in FIG. 2, components of the pressing mechanism 74A are denoted by reference numerals.

The web 71 is pressed by the pressing roller 741 of each of the pressing mechanisms 74A to 74D to cause the corresponding wiping portion 71*a* to contact the corresponding nozzle face 50*a* of the liquid discharge heads 50A to 50D. In other words, the web 71 has multiple wiping portions 71*a* at the positions corresponding to the nozzle faces 50*a* in the width direction.

Each of the pressing mechanisms 74A to 74D can independently switch the posture of the corresponding wiping portion 71*a*. For example, in FIG. 2, the wiping portion 71*a* corresponding to the pressing mechanism 74A separates from the nozzle face 50*a*, and the wiping portions 71*a* corresponding to the pressing mechanisms 74B to 74D contact the nozzle faces 50*a*.

As described above, the posture of the wiping portion 71*a* can be switched to the retracted posture in which the corresponding wiping portion 71*a* separates from the nozzle face 50*a* when any of the nozzle faces 50*a* of the liquid discharge heads 50A to 50D is not to be wiped. As a result, the nozzle face 50*a* is not wiped if unnecessary, to prevent the nozzle face 50*a* from being abraded by wiping. For example, when the liquid is not discharged from any of the nozzle faces 50*a*, the wiping operation of the corresponding nozzle face 50*a* is unnecessary.

Figure 3:
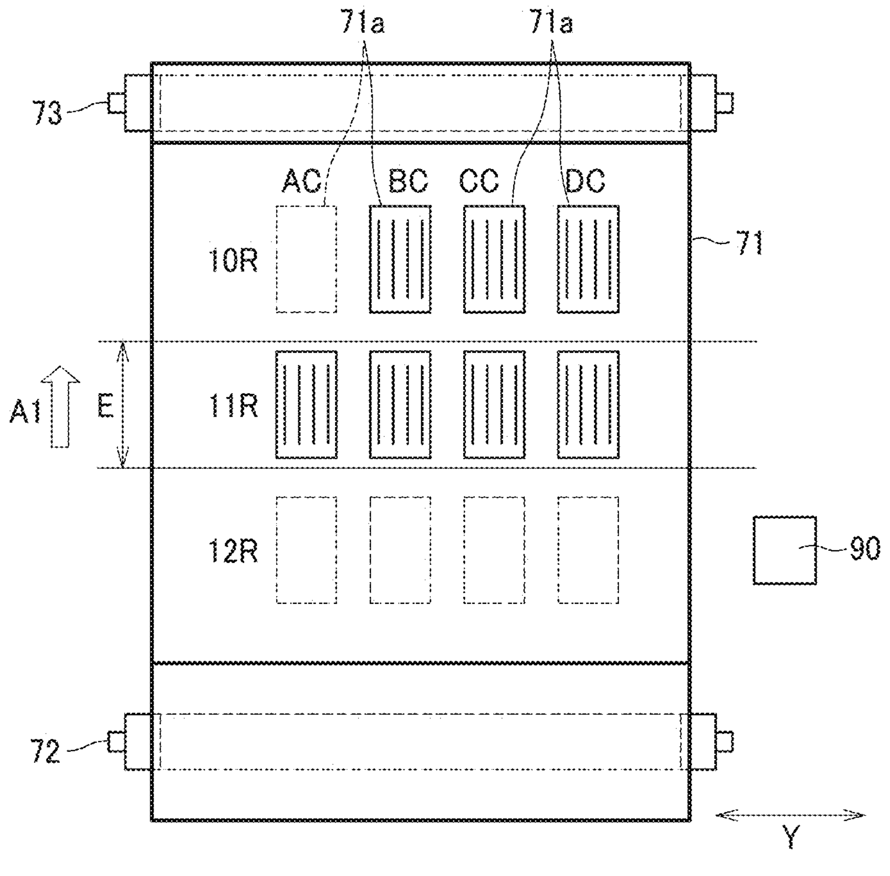
FIG. 3 is a plan view of a web of the wiping device of FIG. 2, illustrating rows and columns of the web.
Figure 4:
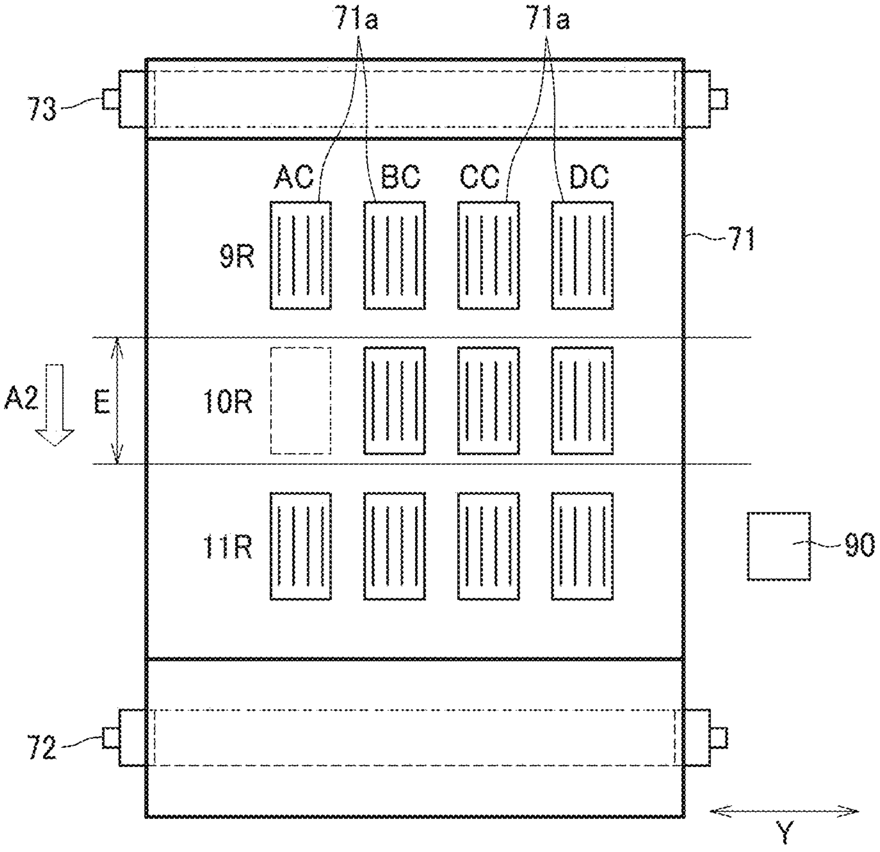
FIG. 4 is a plan view of the web of FIG. 3 being conveyed in a rewinding direction for wiping.

In the present embodiment, the web 71 is rewound to use a partially unused wiping portion of the web 71. The control of the rewinding of the web 71 is described below with reference to FIGS. 3 and 4 and Table 1. The positions in the winding direction of the web 71 (the vertical direction in FIGS. 3 and 4) are represented as a first row, a second row, . . . a tenth row, an eleventh row, a twelfth row . . . of the web 71, and are indicated by, for example, numeral signs 9R, 10R, 11R, and 12R in FIGS. 3 and 4. The positions corresponding to the liquid discharge heads 50A to 50D in the width direction of the web 71 are represented as columns A to D, and are indicated by numeral signs AC, BC, CC, and DC in FIGS. 3 and 4. In FIGS. 3 and 4, portions of the web 71 indicated by the dotted lines are unused wiping portions 71*a*, and portions enclosed by the solid lines are used wiping portions 71*a*. A range E in FIGS. 3 and 4 is a wiping region in which the pressing roller 741 (see FIG. 1) contacts the web 71 to wipe the nozzle face 50*a*. The unused wiping portion 71*a* is a wiping portion 71*a* which is not used for previous wiping operations.

The wiping device 70 performs, for example, C1-th to C3-th wiping operations of the nozzle faces 50*a* under conditions in Table 1. The necessity of the wiping operation for the nozzle face 50*a* of each of the liquid discharge heads 50A to 50D is illustrated in Table 1 below.

TABLE 1

| | 50A | 50B | 50C | 50D |
|---|---|---|---|---|
| C1-th wiping | not to be wiped | to be wiped | to be wiped | to be wiped |
| C2-th wiping | to be wiped | to be wiped | to be wiped | to be wiped |
| C3-th wiping | to be wiped | not to be wiped | not to be wiped | not to be wiped |

As illustrated in Table 1, in the C1-th wiping operation, the nozzle faces 50*a* of the liquid discharge heads 50B to 50D are to be wiped, and the nozzle face 50*a* of the liquid discharge head 50A is not to be wiped. As illustrated in FIG. 3, the tenth row of the web 71 has been used for the C1-th wiping operation, and the wiping portions 71*a* in the columns B to D have been used. Specifically, the pressing mechanisms 74 are moved as illustrated in FIG. 2, to perform the wiping operation of the nozzle faces 50*a* of the liquid discharge heads 50B to 50D by the columns B to D of the web 71. As illustrated in Table 1, in the C2-th wiping operation, the nozzle faces 50*a* of all of the liquid discharge heads 50A to 50D are to be wiped. As illustrated in FIG. 3, the eleventh row of the web 71 has been used for the C2-th wiping operation, and the wiping portions 71*a* in the eleventh row and the columns A to D have been used. FIG. 3 illustrates the web 71 in which the eleventh row is arranged in the wiping region E after the C2-th wiping operation.

As illustrated in Table 1, in the C3-th wiping operation, the nozzle face 50*a* of the liquid discharge head 50A is to be wiped. At this time, in the control according to a comparative example, the following twelfth row of the web 71 is used for the C3-th wiping operation. However, in the present embodiment, the wiping controller 90 recognizes that the wiping portion 71*a* in the tenth row and the column A is unused, and uses this wiping portion 71*a* for the C3-th wiping operation. Specifically, as illustrated in FIG. 4, the web 71 is rewound and conveyed by one row in the direction indicated by blank arrow A2 in FIG. 4, and the tenth row is arranged in the wiping region E. Then, the C3-th wiping operation is performed. Accordingly, all the wiping portions 71*a* in the tenth row have been used.

As described above, in the present embodiment, the web 71 is movable in the direction opposite to the winding direction (i.e., the rewinding direction). Thus, the web 71 can be rewound to use the wiping portion 71*a* which is partially unused. Accordingly, the wiping operation of the nozzle face 50*a* can be efficiently performed by reducing the unused portion of the web 71. Such control can extend the lifetime of the web 71 and reduce the cost of the wiping operation. Further, the length of the web 71 per unit can be reduced and the amount of the web 71 to be discarded can be reduced by the amount of the reduced unused portion of the web 71.

In the above embodiment, the nozzle face 50*a* to be wiped in the C3-th wiping operation completely matches the column of the unused wiping portion 71*a* in the tenth row, but embodiments of the present disclosure are not limited thereto. For example, when the column A and the column B in the X-th row are unused, the X-th row may be used for wiping only the liquid discharge head 50A. In other words, the unused wiping portions 71*a* in the same row can wipe all the nozzle faces 50*a* to be wiped of the liquid discharge heads 50 in combination. Subsequently, the X-th row may be used again when only the liquid discharge head 50B is to be wiped.

Figure 5:
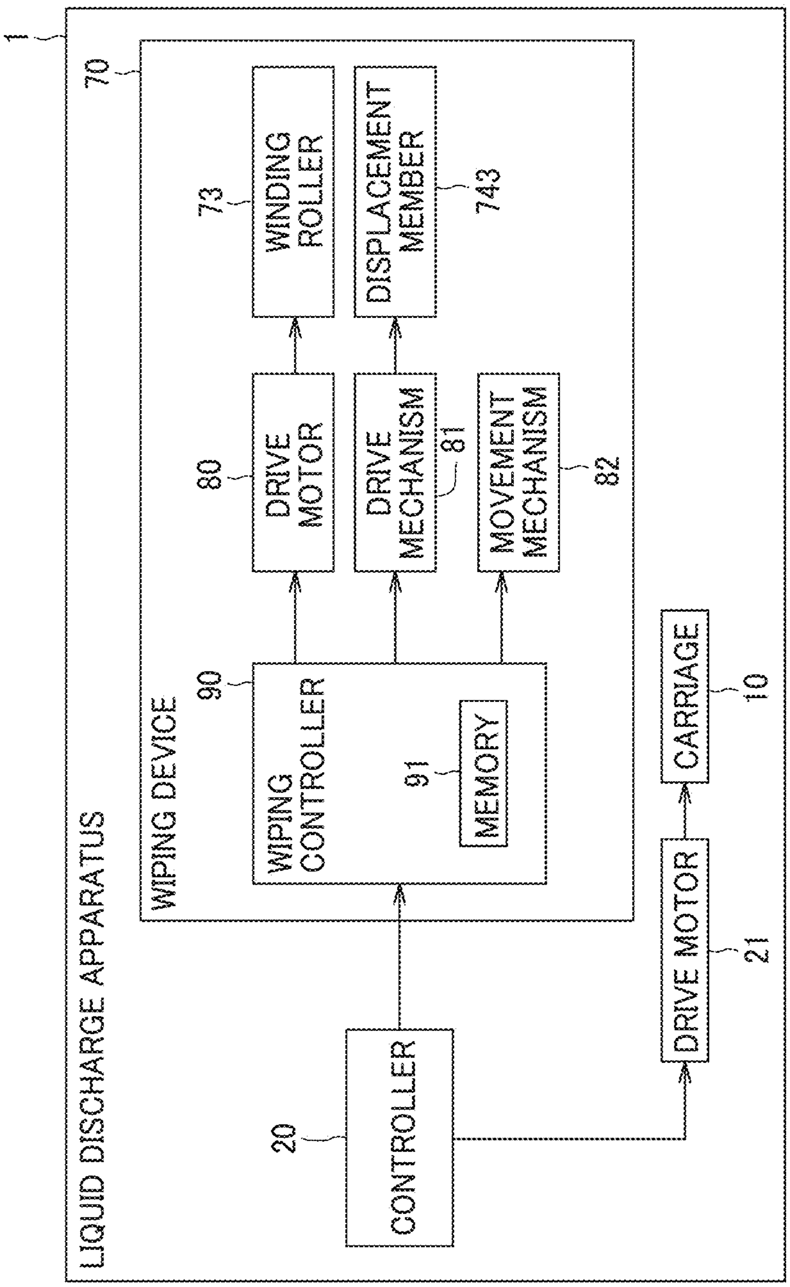
FIG. 5 is a block diagram illustrating control functions of the wiping device of FIG. 1 and a liquid discharge apparatus according to embodiments of the present disclosure.

FIG. 5 is a functional block diagram illustrating functions related to the wiping operation of the wiping device and the liquid discharge apparatus. The functions related to the wiping operation of a liquid discharge apparatus 1 are described below, and a detailed configuration of the liquid discharge apparatus 1 is described later.

As illustrated in FIG. 5, the wiping device 70 includes the wiping controller 90 as circuitry. The wiping controller 90 includes a memory 91. The memory 91 stores whether the wiping portion 71*a* (see FIG. 2) in each row and column of the web 71 is unused or used. The wiping controller 90 drives the drive motor 80 to rotate the winding roller 73 in both the forward and reverse directions. Thus, the web 71 can be conveyed in the winding direction and the rewinding direction. The wiping controller 90 drives a drive mechanism 81 to displace the displacement member 743. Accordingly, the wiping portion 71*a* of the web 71 can be switched between the wiping posture and the retracted posture. The wiping controller 90 of the wiping device 70 can communicate with a controller 20 of the liquid discharge apparatus 1 to receive information indicating which liquid discharge head is a wiping target to be wiped from the controller 20 of the liquid discharge apparatus 1.

Figure 6:
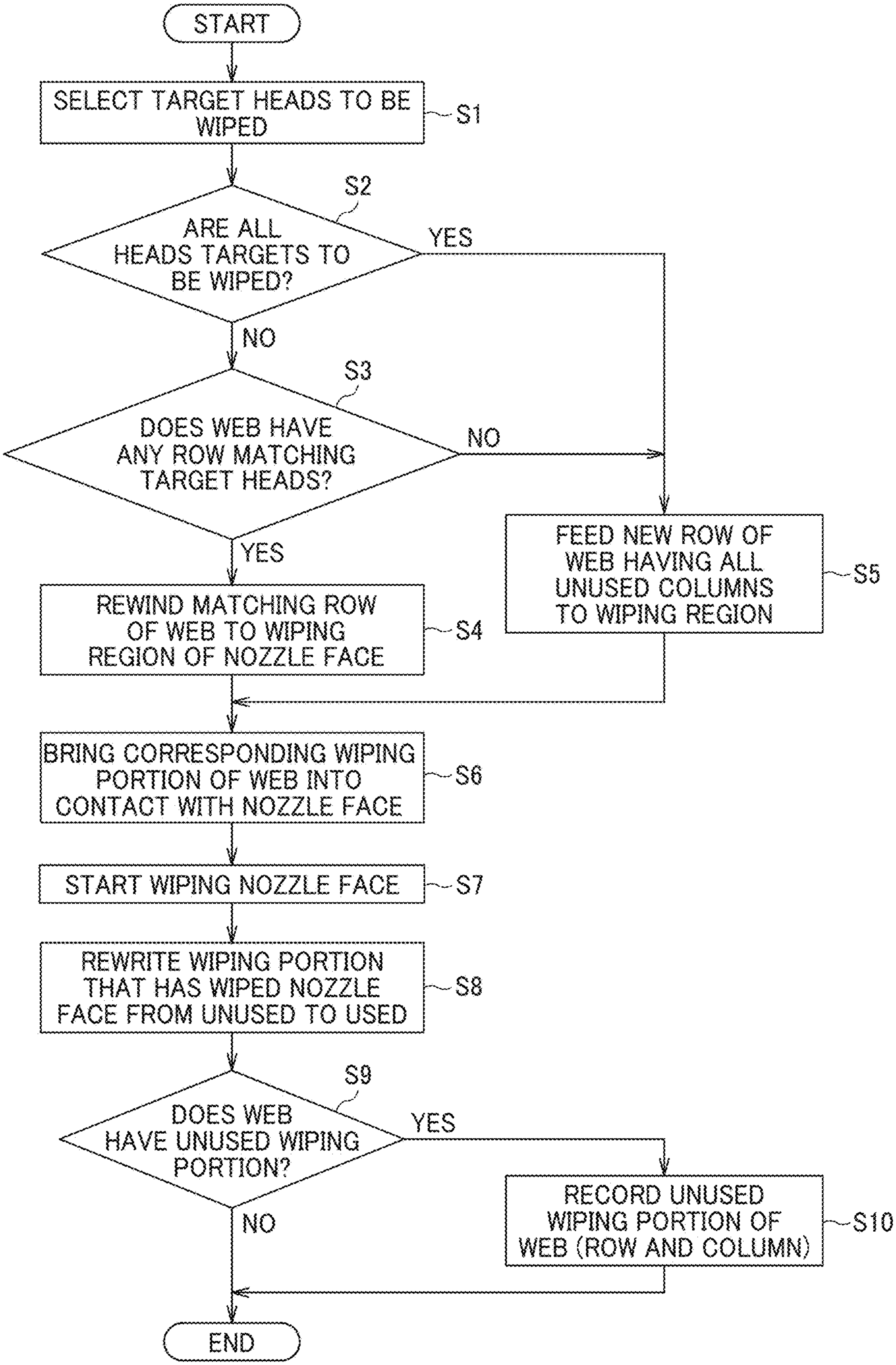
FIG. 6 is a flowchart of a wiping operation according to embodiments of the present disclosure.

A procedure of control of the wiping operation is described below with reference to the functional block diagram of FIG. 5 and a flowchart of FIG. 6. As illustrated in FIG. 6, the controller 20 of the liquid discharge apparatus 1 selects target heads to be wiped among the liquid discharge heads 50A to 50D and transmits data of the target heads to the wiping controller 90 of the wiping device 70 (step S1). The controller 20 of the liquid discharge apparatus 1 drives a drive motor 21 to move the head array 51 to a position where the wiping operation can be performed by the wiping device 70. When the target heads to be wiped are not all the liquid discharge heads 50A to 50D, the wiping controller 90 determines whether the web 71 has a row having unused wiping portions 71*a* corresponding to the target heads to be wiped among the used rows of the web 71. In other words, the wiping controller 90 determines whether the web 71 has any row that matches the target heads to be wiped (steps S2 and S3). When the web 71 has a row matching the target heads, the wiping controller 90 drives the drive motor 80 to rewind the web 71 to convey the matching row of the web 71 to the wiping region E in the rewinding direction (step S4). When the target heads to be wiped are all the liquid discharge heads 50A to 50D or the web 71 has no row matching the target heads among the used rows, the wiping controller 90 drives the drive motor 80 to wind the web 71 to convey the following unused row of the web 71 to the wiping region E in the winding direction (step S5).

Then, the wiping controller 90 drives the drive mechanisms 81 corresponding to the target heads to displace the displacement members 743 of the corresponding pressing mechanisms 74 to bring the corresponding wiping portions 71*a* into contact with the nozzle faces 50*a* of the target heads (step S6) and separate the other wiping portions 71*a* from the nozzle faces 50*a* of the other heads. In this state, a movement mechanism 82 moves the housing 78 of the wiping device 70 illustrated in FIG. 1 in the directions X to move the wiping portion 71*a* relative to the liquid discharge head 50 in the directions X to perform the wiping operation (step S7). Then, the wiping controller 90 rewrites data, which is stored in the memory 91, of the wiping portion 71*a* that has wiped the nozzle face 50*a* from unused to used (step S8).

Lastly, the wiping controller 90 determines whether the web 71 has an unused wiping portion 71*a* in the row of the web 71 used in step S6 (step 9). When the web 71 has an unused wiping portion 71*a*, the wiping controller 90 records data (e.g., the row and column) of the unused wiping portion 71*a* in the memory 91 (step S10). Thus, a series of wiping operations is completed.

In the present embodiment, the wiping device 70 includes the wiping controller 90, but a part or all of the functions of the wiping controller 90 may be implemented by the controller 20 of the liquid discharge apparatus 1.

Figure 7:
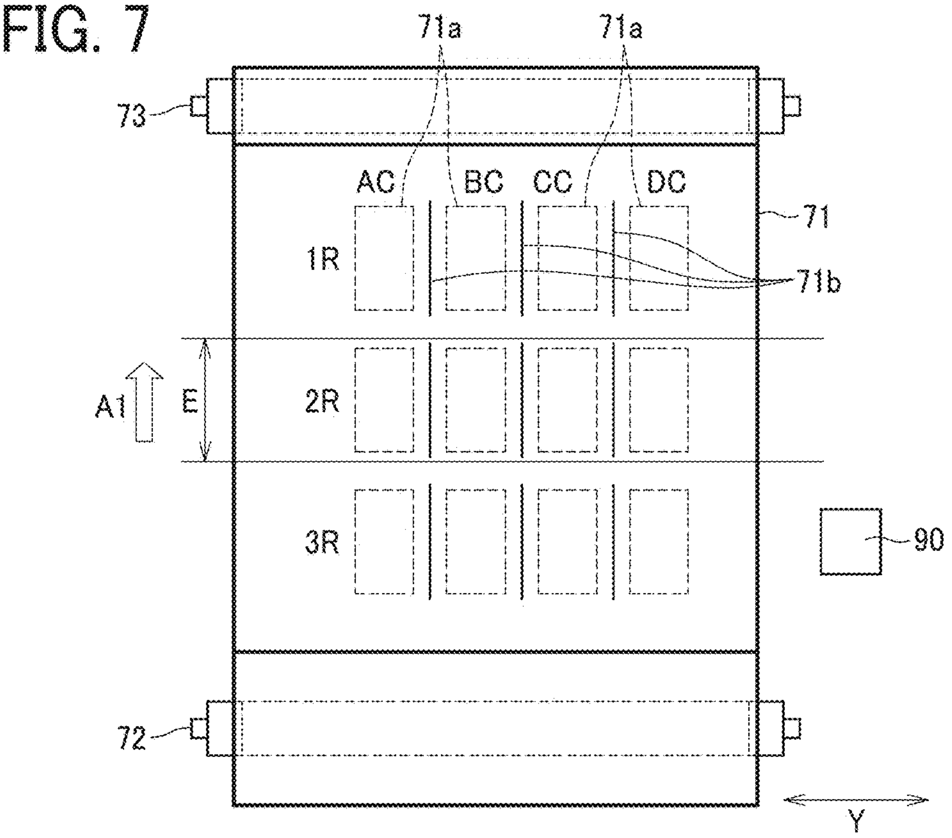
FIG. 7 is a plan view of a web of a wiping device according to a second embodiment of the present disclosure.

A wiping device according to modifications of the present embodiment is described below. As illustrated in FIG. 7, in the present embodiment, slits 71*b* are disposed between the wiping portions 71*a* in the width direction in each row of the web 71. The slits 71*b* extend intermittently in the vertical direction in FIG. 7, which is the winding direction of the web 71. Alternatively, the slits 71*b* may be continuous over multiple rows in the winding direction.

Figure 8:
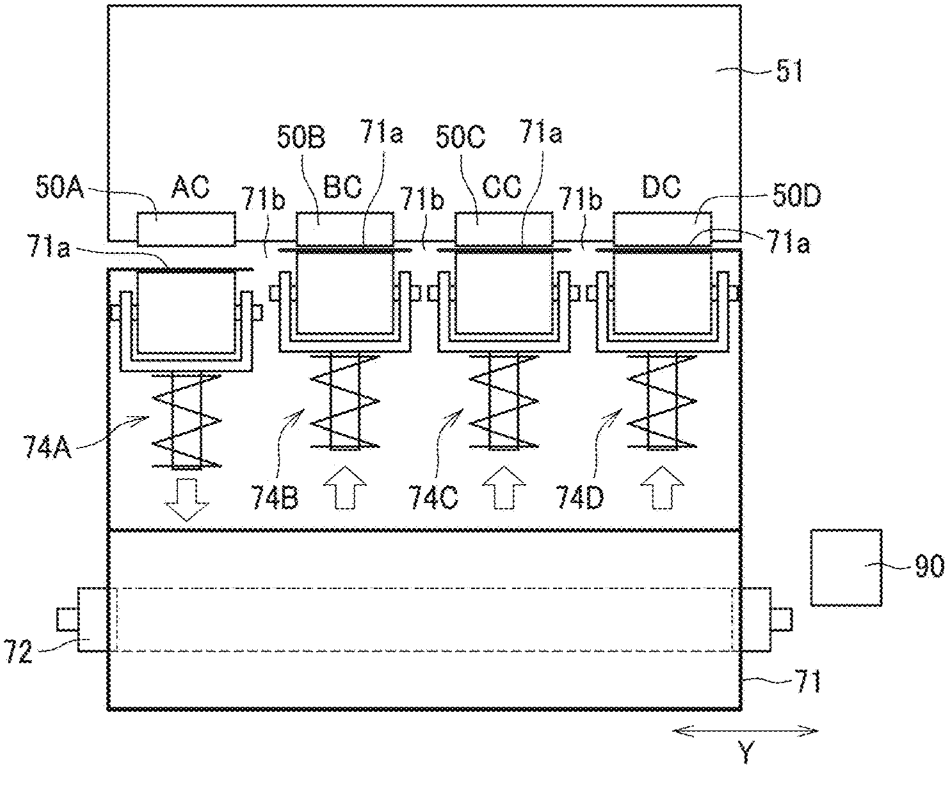
FIG. 8 is a front view of the wiping device of FIG. 7.

The slits 71*b* facilitate the switching of the posture of each wiping portion 71*a* (the displacement of the displacement member 743) even when the adjacent wiping portions 71*a* take different postures. As a result, the wiping portions 71*a* can be accurately brought into contact with the nozzle faces 50*a*. For example, as illustrated in FIG. 8, the pressing mechanism 74A separates the corresponding wiping portion 71*a* from the liquid discharge head 50A, and the pressing mechanism 74B brings the corresponding wiping portion 71*a* into contact with the nozzle face 50*a* of the liquid discharge head 50B. In this case, the wiping portion 71*a* in the column A and the wiping portion 71*a* in the column B freely take the respective postures due to the slit 71*b* between the column A and the column B. Thus, the adjacent wiping portions 71*a* of the web 71 are less likely to be pulled toward each other between the column A and the column B unlike the above-described embodiment illustrated in FIG. 2.

Figure 9:
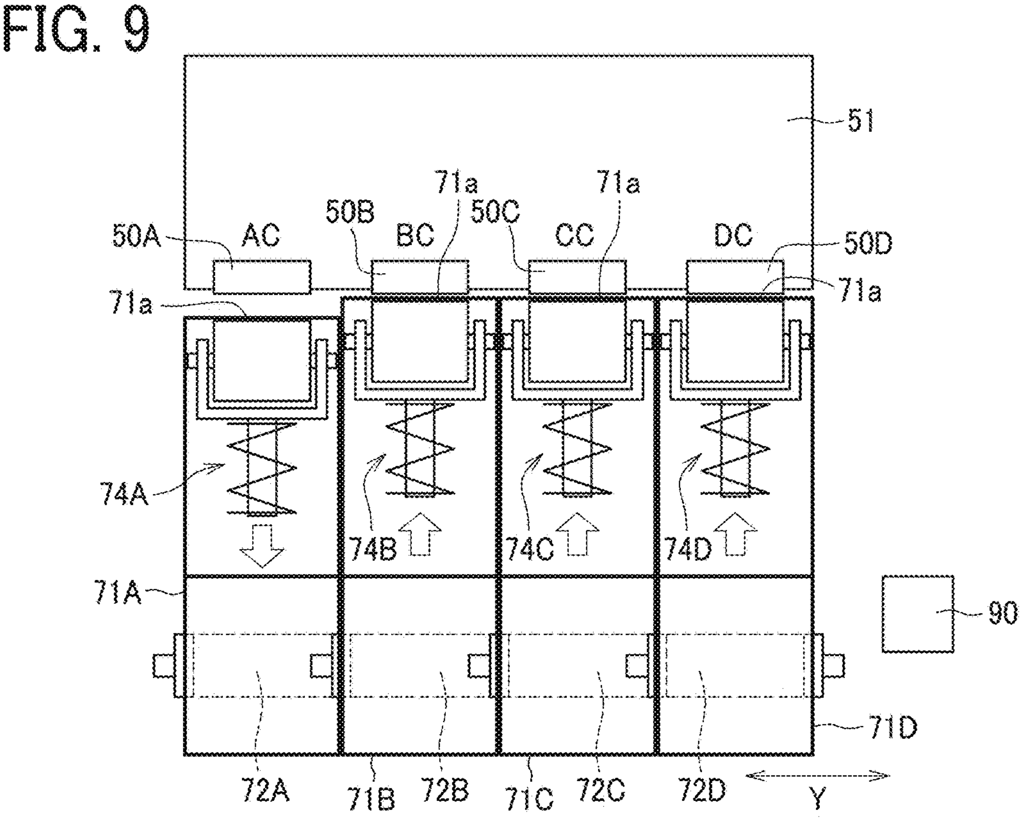
FIG. 9 is a front view of a wiping device according to a third embodiment of the present disclosure.

An embodiment of the present disclosure illustrated in FIG. 9 is different from the above-described embodiment in that webs 71A to 71D (i.e., multiple individual wipers) are provided for the liquid discharge heads 50A to 50D, respectively. A feed roller (feed rollers 72A to 72C in FIG. 9), a winding roller, tension rollers as illustrated in FIG. 2 are individually provided for each of the webs 71A to 71D.

In the present embodiment, since the webs 71A to 71D can be individually conveyed in the winding direction and the rewinding direction, the wiping operation can be performed by the combination of different rows of the webs 71A to 71D. For example, the wiping operation can be performed by the web 71A in the first row, the web 71B in the fifth row, the web 71C in the fourth row, and the web 71D in the first row. Accordingly, the number of the unused wiping portions 71*a* in the used rows can be reduced to perform the wiping operation without waste of the unused wiping portions 71*a*. In addition, the adjacent webs 71 having different postures do not affect each other, and thus the webs 71A to 71D can contact the nozzle faces 50*a* with high accuracy.

Figure 10:
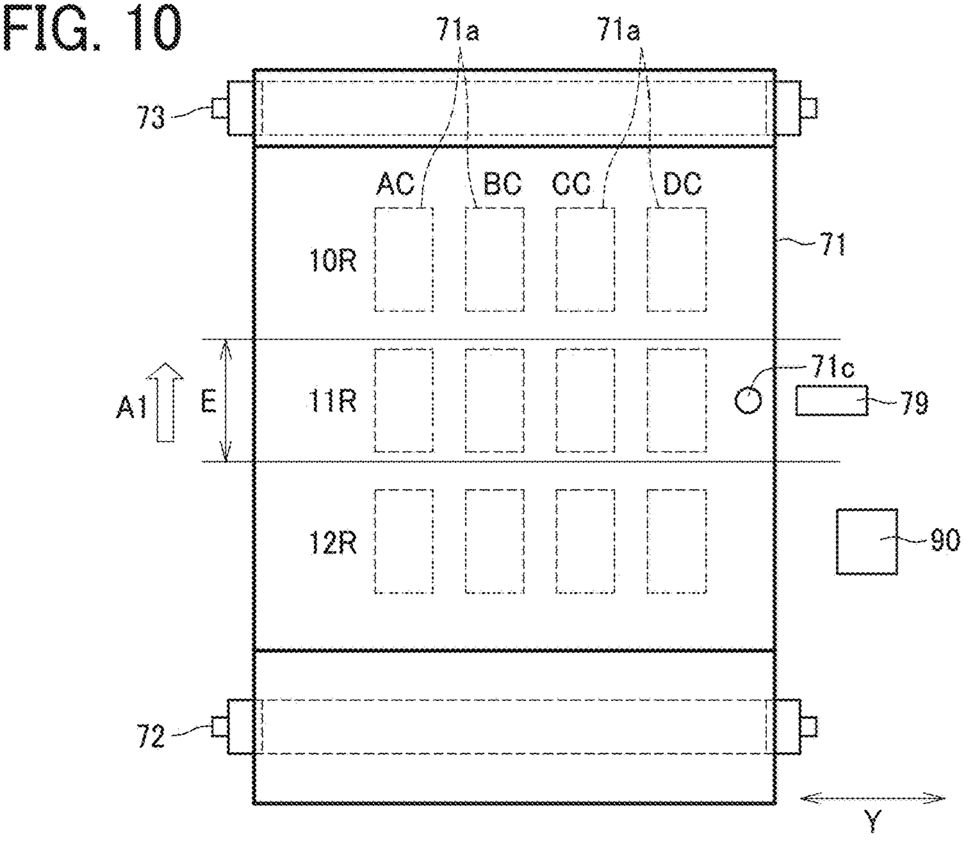
FIG. 10 is a plan view of a web of a wiping device according to a fourth embodiment of the present disclosure.

In an embodiment of the present disclosure illustrated in FIG. 10, a reference mark 71*c* is disposed at a predetermined position in the winding direction of the web 71. For example, the predetermined position can be set by the user in advance. The reference mark 71*c* is disposed outside the wiping region of the wiping portion 71*a* in the width direction. A sensor 79 as a detector is disposed at the predetermined position in the winding direction of the web 71 and outside the web 71 in the width direction.

The web 71 is repeatedly conveyed in the winding direction and the rewinding direction, and thus the position of the web 71 recorded by the wiping controller 90 may be deviated from the actual position of the web 71. The web 71 may be expanded by absorbing ink or contracted by drying, and thus a positional deviation may occur.

In the present embodiment, the sensor 79 reads the reference mark 71*c*, and thus the wiping controller 90 can record the correct position of the web 71 in the winding direction. The wiping controller 90 can correct the positional deviation of the web 71 in the winding direction based on the detection result by the sensor 79. As a result, since the wiping device 70 does not perform the wiping operation with a wrong row, a wiping failure can be prevented.

The reference mark 71*c* may be a hole, and the sensor 79 may be, for example, a transmissive or reflective optical sensor. The reference mark 71*c* may be a printed mark, and the sensor 79 may be a camera or an image processing sensor.

A liquid discharge apparatus including the liquid discharge head and the wiping device according to the present embodiment is described below with reference to FIGS. 11 to 14. In the present embodiment, a serial type liquid discharge apparatus is described, but a line head type may be used.

Figure 11:
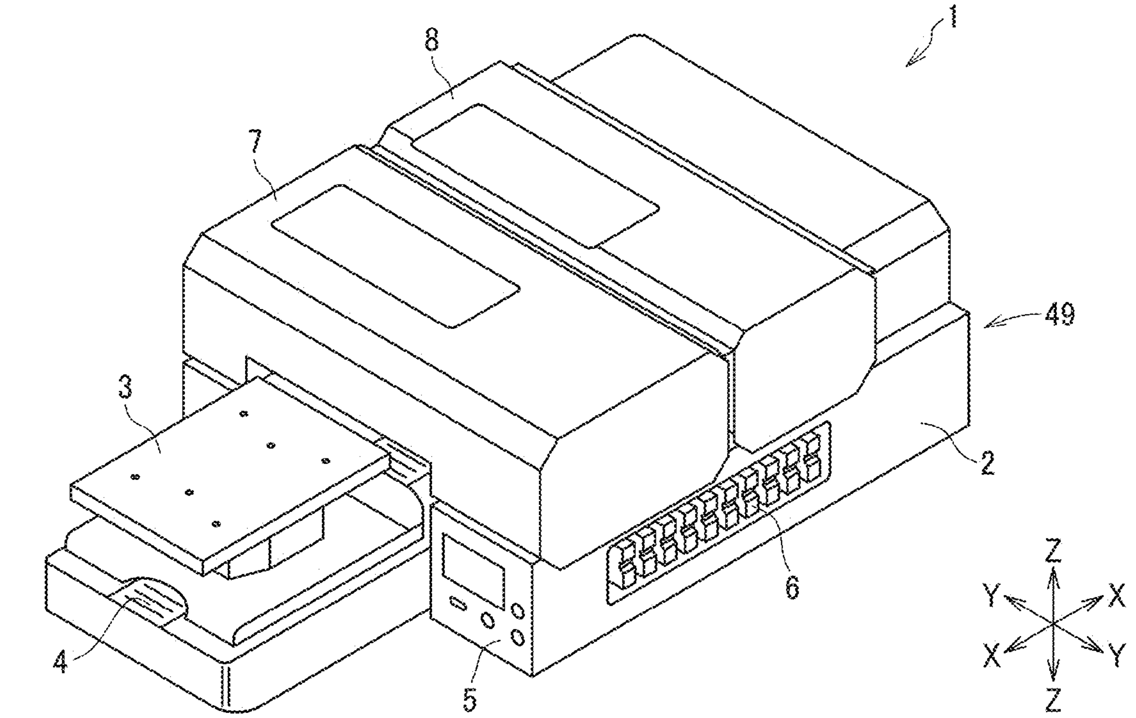
FIG. 11 is a perspective view of a liquid discharge apparatus including a wiping device according to embodiments of the present disclosure.
Figure 12:
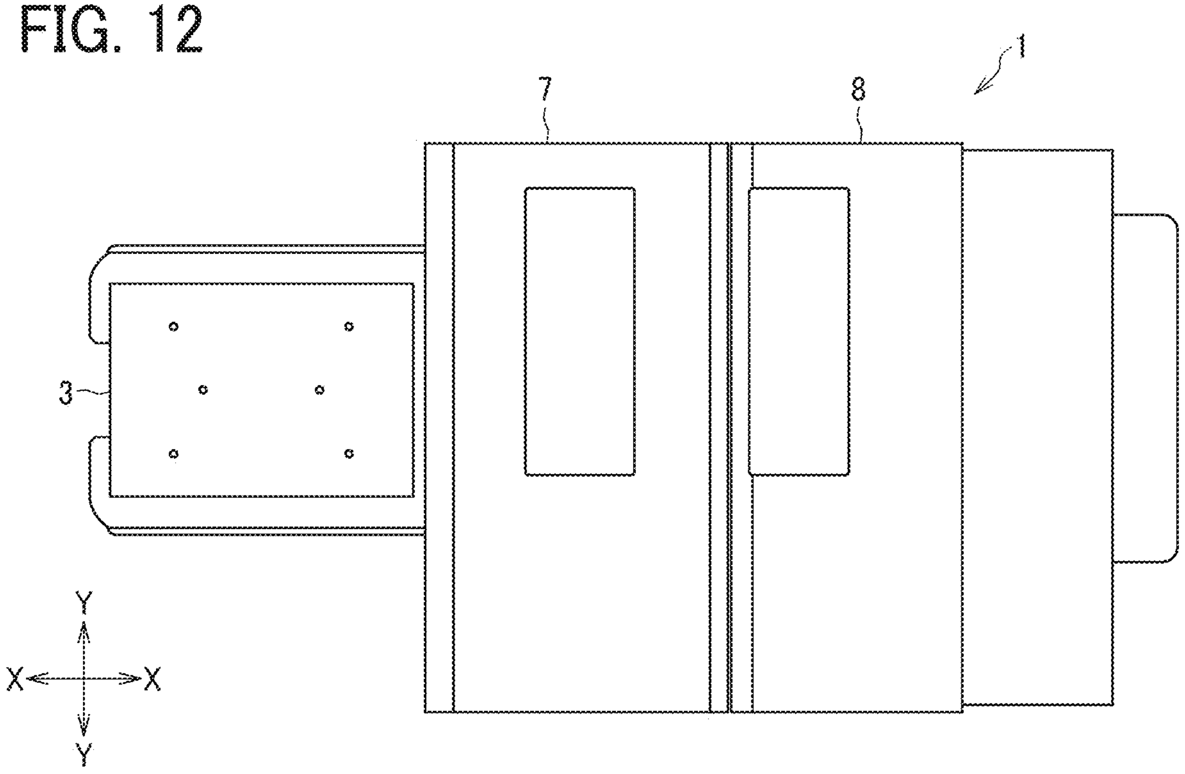
FIG. 12 is a plan view of the liquid discharge apparatus of FIG. 11.
Figure 13:
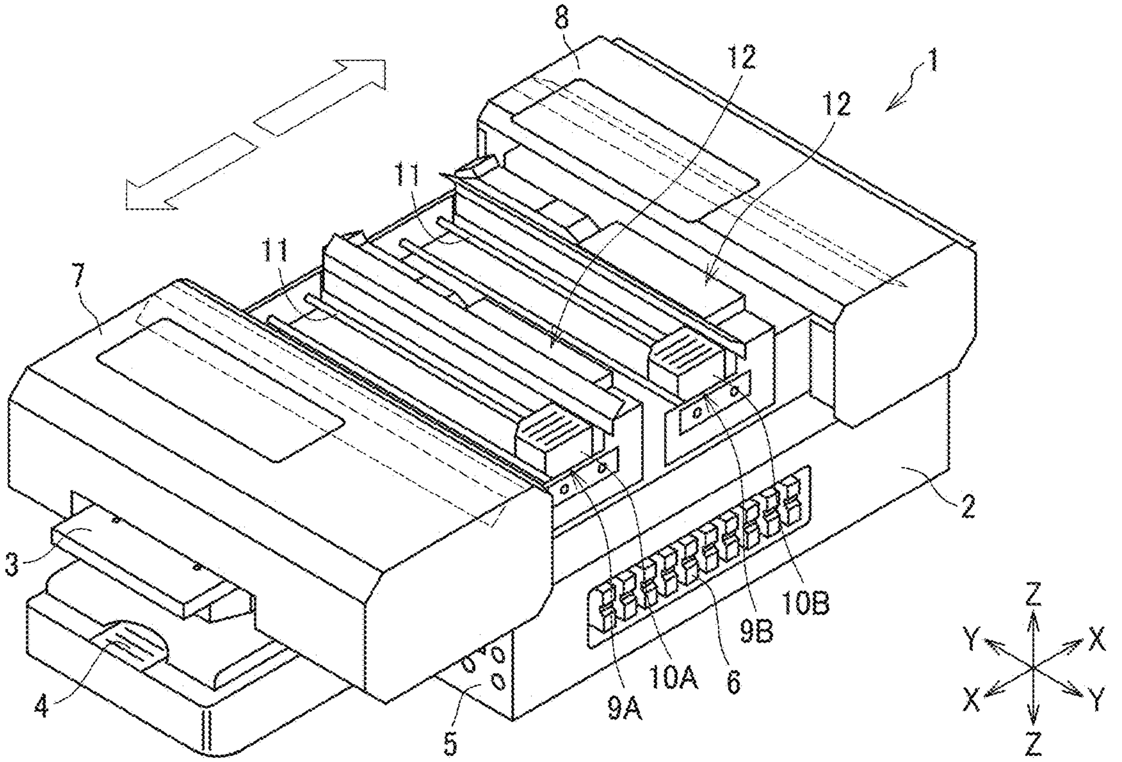
FIG. 13 is a perspective view of the liquid discharge apparatus of FIG. 11 with covers open.
Figure 14:
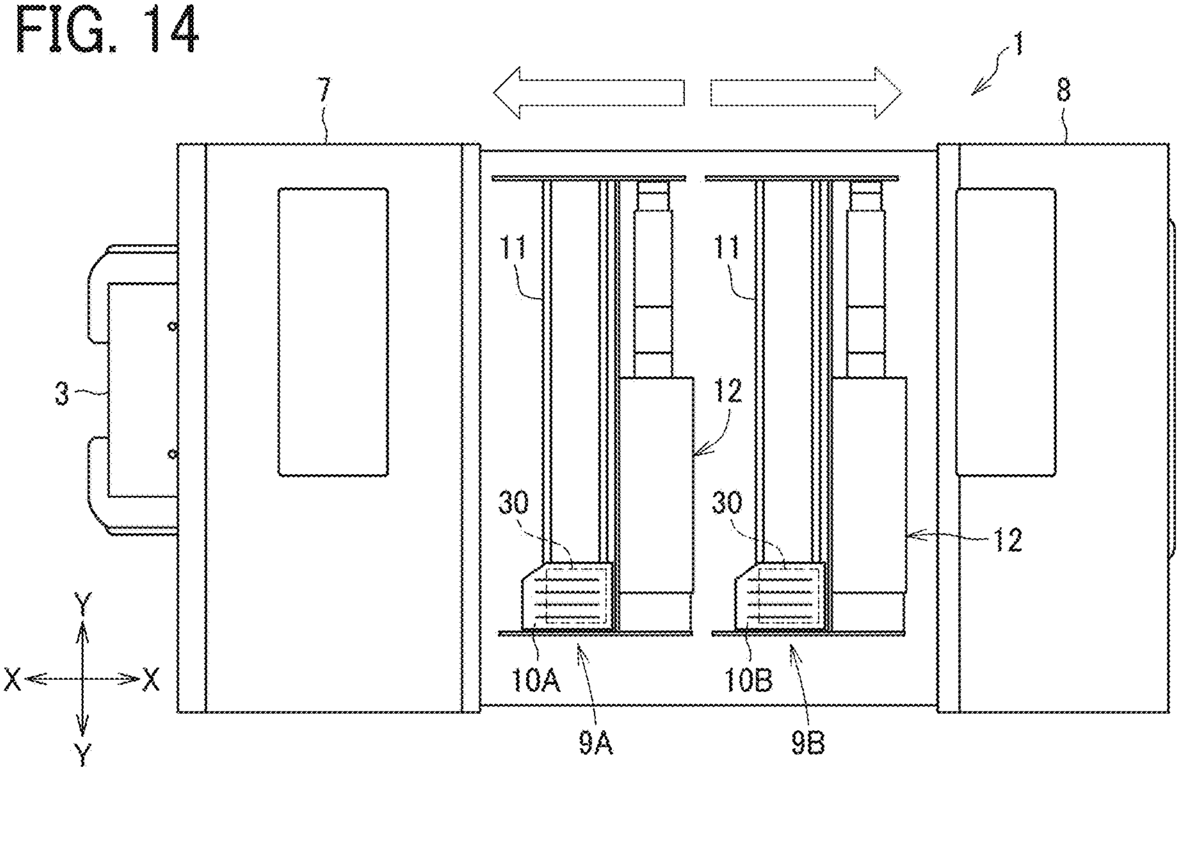
FIG. 14 is a plan view of the liquid discharge apparatus of FIG. 13.

FIG. 11 is a perspective view of a liquid discharge apparatus 1 according to an embodiment of the present disclosure, with covers closed, and FIG. 12 is a plan view thereof. FIG. 13 is a perspective view of the liquid discharge apparatus 1 of FIG. 11, according to the present embodiment, with the covers open, and FIG. 14 is a plan view thereof. The X directions in FIG. 11 are the front-rear direction, sub-scanning direction, and recording-medium conveyance direction of the liquid discharge apparatus 1. The Y directions in FIG. 11 are the transverse direction and main scanning direction of the liquid discharge apparatus 1. The Z directions in FIG. 11 are the vertical direction of the liquid discharge apparatus 1. The X directions and the Y directions are parallel to a surface, onto which a liquid is discharged, of a recording medium on a stage 3, but may have some error. The X, Y, and Z directions are orthogonal to each other.

As illustrated in FIGS. 11 and 12, the liquid discharge apparatus 1 includes the stage 3 in front of a housing 2. The stage 3 is mounted on a guide rail 4. The guide rail 4 extends in the X directions. A control panel 5 is disposed on the front face of the housing 2. An ink cartridge 6 is detachably attached to a side face of the housing 2. A front cover 7 and a rear cover 8 as covers are disposed over the housing 2.

The stage 3 has a flat upper face on which the recording medium is placed. The upper face of the stage 3 is parallel to the X directions and the Y directions. The stage 3 moves on the guide rail 4 to reciprocate in both the X directions.

The stage 3 is movable up and down in the Z directions. Thus, the height of the recording medium placed on the stage 3 is adjustable.

The front cover 7 and the rear cover 8 are movable in both the X directions. In FIG. 11, the front cover 7 has been moved backward and the rear cover 8 has been moved forward to close the front cover 7 and the rear cover 8 (i.e., a closed position). On the other hand, in FIG. 13, the front cover 7 is moved forward and the rear cover 8 is moved backward to open the front cover 7 and the rear cover 8 (i.e., an open position). As described above, the front cover 7 and the rear cover 8 are slidably opened and closed. As a result, an occupied space of the liquid discharge apparatus 1 including an opening and closing space of each of the front cover 7 and the rear cover 8 can be reduced as compared with a configuration in which a front cover and a rear cover are opened and closed in the vertical direction. The front cover 7 and the rear cover 8 have openings at both ends in the front-rear direction. When the front cover 7 and the rear cover 8 are closed, the front cover 7 and the rear cover 8 are continuously arranged in the front-rear direction.

As illustrated in FIGS. 13 and 14, an apparatus body 49 of the liquid discharge apparatus 1 includes, for example, the housing 2 and liquid discharge units 9A and 9B mounted on the housing 2. In the present embodiment, specifically, the apparatus body 49 is a portion of the liquid discharge apparatus 1 other than the front cover 7 and the rear cover 8. The front cover 7 and the rear cover 8 are slidable in the X directions relative to the apparatus body 49.

The front cover 7 and the rear cover 8 are opened to expose the liquid discharge units 9A and 9B to the outside of the liquid discharge apparatus 1. When the liquid discharge units 9A and 9B are exposed to the outside, an operator can clean a maintenance unit 30, the liquid discharge head 50, and the surroundings thereof, or can replace carriages 10A and 10B. The front cover 7 and the rear cover 8 are closed during image formation. As a result, the liquid discharge units 9A and 9B are covered by the front cover 7 and the rear cover 8 to block access to operation units such as the carriages 10A and 10B of the liquid discharge units 9A and 9B from the outside. The liquid discharge units 9A and 9B are disposed in the closed space in the front cover 7 or the rear cover 8. Accordingly, a mist of ink (liquid) is prevented from scattering to environs outside the liquid discharge apparatus 1 while the liquid discharge head 50 discharges the ink to the recording medium (i.e., during liquid discharge operation). Further, the liquid discharge units 9A and 9B may include a fan to circulate airflow in the front cover 7 or the rear cover 8 to collect the generated mist of the ink (i.e., ink mist) in the front cover 7 or the rear cover 8.

The liquid discharge apparatus 1 according to the present embodiment includes the two liquid discharge units 9A and 9B arranged side by side in the X directions. The liquid discharge unit 9A discharges color ink and white ink. The liquid discharge unit 9B discharges a pretreatment liquid. The liquid discharged by each of the liquid discharge units 9A and 9B is not limited to the above example, and any liquid of the color ink, the white ink, and the pretreatment liquid may be discharged by each of the liquid discharge units 9A and 9B. In particular, when the recording medium is a fabric, the pretreatment liquid is preferably applied to the recording medium before the image formation using the ink. In other words, one of the liquid discharge units 9A and 9B preferably discharges the pretreatment liquid.

Since the liquid discharge units 9A and 9B have similar configurations, the liquid discharge unit 9A is described below. The liquid discharge unit 9A includes the carriage 10A, a guide rod 11, an electrical component unit 12 including, for example, a board and an electrical component cover, and the maintenance unit 30. The liquid discharge units 9A and 9B and the carriages 10A and 10B are also referred to simply as a liquid discharge unit 9 and the carriage 10, respectively, unless distinguished.

The guide rod 11 extends in the main scanning direction. The carriage 10 is movable in the main scanning direction along the guide rod 11. The carriage 10 includes multiple liquid discharge heads 50, or one or multiple head units each including a plurality of liquid discharge heads 50. The maintenance unit 30 is disposed at a position facing the guide rod 11 outside a liquid discharge region on one side in the transverse direction (Y directions). The maintenance unit 30 includes the wiping device 70 described above and a suction mechanism that sucks the nozzle face 50*a*.

The process of forming an image on the recording medium by the liquid discharge head 50 is described below. The recording medium is placed on the stage 3 and conveyed along the guide rail 4. The recording medium is conveyed to a rear side of the liquid discharge apparatus 1, and the pretreatment liquid is applied to the recording medium by the liquid discharge unit 9B. Specifically, while the carriage 10B moves in the main scanning direction along the guide rod 11, the liquid discharge unit 9B discharges the pretreatment liquid from the nozzles of the liquid discharge head 50 to apply the pretreatment liquid to the entire width of the recording medium in the main scanning direction. The application of the pretreatment liquid is repeated at multiple positions in the sub-scanning direction. As a result, the pretreatment liquid is applied to the entire recording medium. After that, the stage 3 moves forward, and the liquid discharge unit 9A discharges the color ink of multiple colors onto the recording medium using a method similar to that of the liquid discharge unit 9B. When white color is printed on the recording medium, for example, the liquid discharge unit 9A discharges the white ink onto the recording medium, the stage 3 moves to the rear side of the liquid discharge unit 9A again, and the liquid discharge unit 9A discharges the color ink onto the recording medium. Thus, an image is formed on the recording medium.

Figure 15:
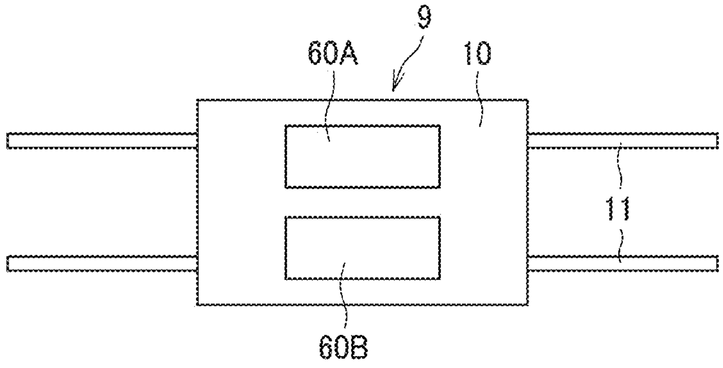
FIG. 15 is a plan view of a liquid discharge unit including two liquid discharge head units mounted on one carriage, according to embodiments of the present disclosure.

As illustrated in FIG. 15, the carriage 10 may include multiple head units 60A and 60B. The head unit 60A is disposed on the back side of the liquid discharge apparatus 1, and the head unit 60B is disposed on the front side of the liquid discharge apparatus 1. In this case, for example, the pretreatment liquid is discharged by the head unit 60A, and the white ink or the color ink is discharged by the head unit 60B.

In the liquid discharge apparatus 1 described above, the wiping device 70 described above can perform the wiping operation on the multiple liquid discharge heads 50 of the multiple head units 60A and 60B mounted on the carriage 10. Accordingly, the number of the unused wiping portions 71*a* of the web 71 in the used rows can be reduced.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

In the above-described embodiments, all of the wiping portions contact and separate from the nozzle faces, but only some of the wiping portions may contact and separate from the nozzle faces. Specific wiping portions may share a pressing mechanism, and both the wiping portions simultaneously contact and separate from the nozzle faces. The wiping device according to embodiments of the present disclosure can individually switch the posture of each wiping portion relative to the nozzle face. However, the "each wiping portion" does not necessarily correspond to all the wiping portions in the wiping device, and the "individually switch" does not necessarily mean that all the wiping portions that can switch the posture can be independently switched.

In the embodiment illustrated in FIG. 9, all the wiping portions 71*a* is not necessarily wound and rewound individually. For example, a wiping device may include webs 71A and 71B respectively having the wiping portions 71*a* corresponding to the column A and the column B, and the web 71 having two wiping portions 71*a* corresponding to the column C and the column D, and further, the features of the embodiments illustrated in FIGS. 7 and 9 may be combined such that a slit may be formed between the column C and the column D of the web 71.

In the present disclosure, the liquid to be discharged is not limited to a particular liquid as long as the liquid has a viscosity or surface tension to be discharged from a head (liquid discharge head). However, preferably, the viscosity of the liquid is not greater than 30 millipascal-second (mPa·s) under ordinary temperature and ordinary pressure or by heating or cooling. Examples of the liquid to be discharged include a solution, a suspension, or an emulsion including, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

The term "liquid" includes not only ink but also paint, a pretreatment liquid, a binder, and an overcoat liquid.

In the present disclosure, the term "liquid discharge apparatus" includes a carriage including a liquid discharge head and drives the liquid discharge head to discharge liquid. The term "liquid discharge apparatus" used in the present disclosure includes, in addition to apparatuses to discharge liquid to a recording medium serving as a medium onto which liquid can adhere, apparatuses to discharge the liquid into gas (air) or liquid.

For example, the "liquid discharge apparatus" may further include devices relating to feeding, conveying, and ejecting of the medium onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers to form a three-dimensional object.

The "liquid discharge apparatus" is not limited to an apparatus that discharges liquid to visualize meaningful images such as characters or figures. For example, the liquid discharge apparatus may be an apparatus that forms patterns having no meaning or an apparatus that fabricates three-dimensional images.

The above-described term "medium onto which liquid can adhere" represents a medium on which liquid is at least temporarily adhered, a medium on which liquid is adhered and fixed, or a medium into which liquid adheres and permeates. Specific examples of the "medium onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "medium onto which liquid can adhere" includes any medium to which liquid adheres, unless otherwise specified.

Examples of materials of the "medium onto which liquid can adhere" include any materials to which liquid can adhere even temporarily, such as paper, thread, fiber, fabric, leather, metal, plastic, glass, wood, and ceramic.

The term "liquid discharge apparatus" may be, for example, an apparatus in which the liquid discharge head and the medium onto which liquid can adhere move relative to each other. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

The terms "image formation," "recording," "printing," "image printing," and "fabricating" used in the present disclosure may be used synonymously with each other.

Aspects of the present disclosure are, for example, as follows.

Aspect 1

A wiping device includes a windable wiper having wiping portions and a pressing mechanism, to wipe a nozzle face having an opening end of a nozzle. The nozzle face is a surface of a liquid discharge head. The wiper is wound and rewound, and has the wiping portions that contact the nozzle faces of multiple liquid discharge heads arranged in a width direction of the wiper. Each of the wiping portions individually switches between a wiping posture in which the wiping portions contact the nozzle faces and a retracted posture in which the wiping portions retract farther away from the nozzle faces than in the wiping posture. A partially remaining unused wiping portion in the width direction of the wiper is brought into contact with the nozzle face by rewinding the wiper.

In other words, a wiping device includes a web, multiple pressing mechanisms, and circuitry. The web is windable in a winding direction and a rewinding direction opposite to the winding direction, to wipe nozzle faces of multiple liquid discharge heads arranged in a width direction orthogonal to the winding direction. The multiple pressing mechanisms are arranged in the width direction corresponding to the multiple liquid discharge heads. Each of the multiple pressing mechanisms is movable between a wiping position to cause the web to contact corresponding one of the nozzle faces of the multiple liquid discharge heads and a retracted position to cause the web to be separated from the corresponding one of the nozzle faces. The circuitry is configured to store unused portion of the web at which a part of the multiple pressing mechanisms is at the retracted position during wiping in a memory, rewind the web in the rewinding direction to cause the unused portion of the web to face a part of the nozzle faces unwiped, and cause the part of the multiple pressing mechanisms corresponding to the unused portion of the web to move to the wiping position to bring the unused portion of the web into contact with the part of the nozzle faces unwiped.

Aspect 2

In the wiping device according to Aspect 1, the wiper includes multiple wiping portions in the width direction and slits between the wiping portions.

In other words, the web has multiple wiping portions corresponding to the multiple pressing mechanisms in the width direction and a slit between the multiple wiping portions in the width direction.

Aspect 3

The wiping device according to Aspect 1 or 2 further includes multiple wipers in the width direction. Each of the wipers is individually wound and rewound.

In other words, the wiping device according to Aspect 1 further includes multiple webs including the web. The multiple webs respectively correspond to the multiple pressing mechanisms and the nozzle faces of the multiple liquid discharge heads. The multiple webs are separated from each other in the width direction. Each of the multiple webs is individually windable in the winding direction and rewindable in the rewinding direction.

Aspect 4

A liquid discharge apparatus includes the wiping device according to any one of Aspects 1 to 3 and multiple liquid discharge heads.

In other words, a liquid discharge apparatus includes the wiping device according to any one of Aspects 1 to 3 and the multiple liquid discharge heads having the nozzle faces to be wiped by the web.

Aspect 5

In the liquid discharge apparatus according to Aspect 4, the wiper has a mark at a predetermined position in the winding direction of the wiper. The liquid discharge apparatus further includes a detection member to detect a position of the wiper in the winding direction by reading the mark.

In other words, the liquid discharge apparatus according to Aspect 4, further includes a detector to detect a position of the web in the winding direction. The web has a reference mark at a predetermined position of the web in the winding direction. The detector reads the reference mark to detect the position of the web in the winding direction.

According to one aspect of the present disclosure, the wiping device can be provided that reduces an unused portion of the wiper.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A wiping device comprising:

a web windable in a winding direction and a rewinding direction opposite to the winding direction, to wipe nozzle faces of multiple liquid discharge heads arranged in a width direction orthogonal to the winding direction;

multiple pressing mechanisms arranged in the width direction corresponding to the multiple liquid discharge heads, each of the multiple pressing mechanisms movable between:

a wiping position to cause the web to contact corresponding one of the nozzle faces of the multiple liquid discharge heads; and a retracted position to cause the web to be separated from the corresponding one of the nozzle faces; and circuitry configured to:

store unused portion of the web at which a part of the multiple pressing mechanisms is at the retracted position during wiping in a memory;

rewind the web in the rewinding direction to cause the unused portion of the web to face a part of the nozzle faces unwiped; and cause the part of the multiple pressing mechanisms corresponding to the unused portion of the web to move to the wiping position to bring the unused portion of the web into contact with the part of the nozzle faces unwiped.

2. The wiping device according to claim 1, wherein the web has:

multiple wiping portions corresponding to the multiple pressing mechanisms in the width direction; and a slit between the multiple wiping portions in the width direction.

3. The wiping device according to claim 1, further comprising multiple webs including the web, wherein the multiple webs respectively corresponding to the multiple pressing mechanisms and the nozzle faces of the multiple liquid discharge heads, the multiple webs are separated from each other in the width direction, and each of the multiple webs is individually windable in the winding direction and rewindable in the rewinding direction.

4. A liquid discharge apparatus comprising:

the wiping device according to claim 1; and the multiple liquid discharge heads having the nozzle faces to be wiped by the web.

5. The liquid discharge apparatus according to claim 4, further comprising a detector to detect a position of the web in the winding direction, wherein the web has a reference mark at a predetermined position of the web in the winding direction, and the detector reads the reference mark to detect the position of the web in the winding direction.

* * * * *